(12) United States Patent
Baruch

(10) Patent No.: US 10,580,140 B2
(45) Date of Patent: Mar. 3, 2020

(54) METHOD AND SYSTEM OF REAL-TIME IMAGE SEGMENTATION FOR IMAGE PROCESSING

(71) Applicant: INTEL CORPORATION, Santa Clara, CA (US)

(72) Inventor: Gilad Baruch, Jerusalemi (IL)

(73) Assignee: Intel Corporation, Santa Clara, CA (US)

( * ) Notice: Subject to any disclaimer, the term of this patent is extended or adjusted under 35 U.S.C. 154(b) by 770 days.

(21) Appl. No.: 15/162,478

(22) Filed: May 23, 2016

(65) Prior Publication Data

US 2017/0337693 A1  Nov. 23, 2017

(51) Int. Cl.
| | | |
|---|---|---|
| G06T 7/00 | (2017.01) | |
| G06T 7/60 | (2017.01) | |
| G06T 7/143 | (2017.01) | |
| G06T 7/168 | (2017.01) | |
| G06T 7/174 | (2017.01) | |
| G06T 7/246 | (2017.01) | |
| G06T 7/162 | (2017.01) | |
| G06T 7/194 | (2017.01) | |
| G06T 7/12 | (2017.01) | |

(52) U.S. Cl.
CPC .............. *G06T 7/143* (2017.01); *G06T 7/12* (2017.01); *G06T 7/162* (2017.01); *G06T 7/168* (2017.01); *G06T 7/174* (2017.01); *G06T 7/194* (2017.01); *G06T 7/246* (2017.01); *G06T 2207/10016* (2013.01); *G06T 2207/20072* (2013.01); *G06T 2207/20112* (2013.01); *G06T 2207/20116* (2013.01); *G06T 2207/30196* (2013.01)

(58) Field of Classification Search
USPC .................................. 382/173–180, 164, 171
See application file for complete search history.

(56) References Cited

U.S. PATENT DOCUMENTS

| | | | | |
|---|---|---|---|---|
| 2003/0025794 | A1* | 2/2003 | Fujii ....................... | G06T 7/215 348/169 |
| 2017/0124717 | A1 | 5/2017 | Baruch et al. | |
| 2017/0236290 | A1* | 8/2017 | Sorkine Hornung ..... | G06T 7/11 382/173 |

OTHER PUBLICATIONS

"Active Contour Model", retrieved from https://en.wikipedia.org/wiki/Active_contour_model, downloaded Dec. 22, 2015, 13 pages.
Garrett et al., "Live Video Object Tracking and Segmentation Using Graph Cuts", ICIP 2008, pp. 1576-1579.
"Graph Cuts in Computer Vision.Com", retrieved from https://en.wikipedia.org/wiki/Graph_cuts_in_computer_vision, downloaded May 23, 2016, 9 pages.
"Motion Estimation", retrieved from https://en.wikipedia.org/w/index.php?title=Motion_estimation&oldid=715965795, downloaded May 23, 2016, 5 pages.
Schoenemann et al., Near Real-Time Motion Segmentation Using Graph Cuts, K. Franke et al. (Eds.): DAGM 2006, LNCS 4174, pp. 455-464, 2006.

(Continued)

*Primary Examiner* — Dwayne D Bost
*Assistant Examiner* — Stephen M Brinich
(74) *Attorney, Agent, or Firm* — Green, Howard & Mughal LLP.

(57) ABSTRACT

Techniques related to a system, article, and method of real-time image segmentation for image processing.

25 Claims, 10 Drawing Sheets

(56) References Cited

OTHER PUBLICATIONS

"Threadpool", retrieved from https://en.wikipedia.org/w/index.php?title=Thread_pool&oldid=703877691, downloaded May 23, 2016, 5 pages.

Baruch, et al., "Histogram-Based Mean Shift Segmentation," U.S. Appl. No. 14/866,686, filed Sep. 25, 2015, not yet published, 66 pages.

Hickson et al., "Efficient Hierarchical Graph-Based Segmentation of RGBD Videos," 26th IEEE Conference on Computer Vision and Pattern Recognition, Columbus, OH, USA, Jun. 2014, Georgia Institute of Technology, Atlanta, GA, USA , 2Microsoft Robotics, Seattle, WA, USA, http://www.cc.gatech.edu/cpl/projects/4dseg, 8 pages.

Mille, Julien, "Parameterized Narrow Band Active Contour", Universite' François Rabelais de Tours, Laboratoire Informatique (EA2101) http://liris.cnrs.fr/Documents/Liris-4476.pdf, May 18, 2009, 25 pages.

"Structural Analysis and Shape Descriptors", OpenCV 2.4.12.0 descriptors; http://docs.opencv.org/2.4/modules/imgproc/doc/structural_analysis_and_shape_descriptors.html#findcontours, retrieved Feb. 10, 2016, 19 pages.

Sallem, et al., Extended GrabCut for 3D and RGB-D Point Clouds, Proceedings at Advanced Concepts for Intelligent Vision Systems, 15th International Conference (2013), 12 pages.

"Level Set", https://en.wikipedia.org/wiki/Level_set, Dec. 22, 2015, 6 pages.

"Mathematical Morpohololgy", https://en.wikipedia.org/wiki/Mathematical_morphology#Erosion, Dec. 22, 2015, 17 pages.

"Mixture Model", https://en.wikipedia.org/wiki/Mixture_model#Gaussian_mixture_model, Dec. 22, 2015, 17 pages.

"Parallel Curve", https://en.wikipedia.org/wiki/Parallel_curve, Dec. 22, 2015, 9 pages.

Xu et al., "Active Contours, Deformable Models, and Gradient Vector Flow", 12 pages.

Yu et al., "Monocular Video Foreground/Background Segmentation by Tracking Spatial-Color Gaussian Mixture Models", in Proc. IEEE Workshop on Motion and Video Computing (WMVC '07), Feb. 2007, 8 pages.

Comaniciu et al., "Mean Shift: A Robust Approach Toward Feature Space Analysis," IEEE Transactions on Pattern Analysis and Machine Intelligence, vol. 24, No. 5, May 2002, 17 pages.

Forsyth, D.A., "Segmenting Images and Mean Shift," last modified Oct. 11, 2011, 39 pages.

Mille, Julien, "Narrow band region-based active contours and surfaces for 2D and 3D segmentation," Preprint submitted to Computer Vision and Image Understanding May 18, 2009, 25 pages.

Rother et al., "Grab Cut," Image and Video Editing, Microsoft Research Cambridge, http://research.microsoft.com/en-us/um/cambridge/projects/visionimagevideoediting/segmentation/grabcut.htm, 2 pages.

* cited by examiner

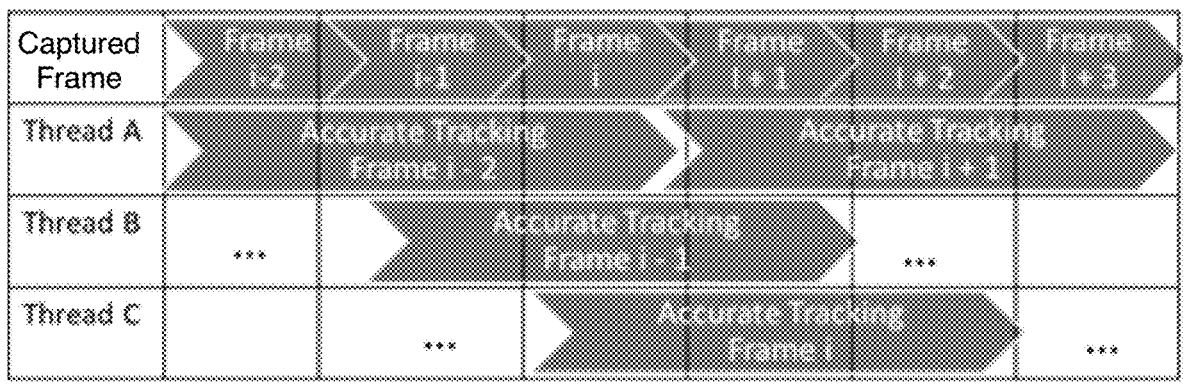

OBTAIN IMAGE DATA OF A PLURALITY OF FRAMES OF A VIDEO SEQUENCE COMPRISING A PRIOR FRAME AND A SUBSEQUENT FRAME RELATIVE TO THE PRIOR FRAME AND IN DISPLAY ORDER OF THE VIDEO SEQUENCE 302

USE AN ACCURACY-BASED SEGMENTATION ALGORITHM TO DETERMINE A PRIOR CONTOUR SEPARATING SEGMENTS ON THE PRIOR FRAME 304

USE A SPEED-BASED SEGMENTATION ALGORITHM APPLIED TO THE PRIOR CONTOUR LOCATED ON THE SUBSEQUENT FRAME TO DETERMINE A SUBSEQUENT CONTOUR ON THE SUBSEQUENT FRAME TO BE USED TO MODIFY OR DISPLAY OR BOTH THE SUBSEQUENT FRAME 306

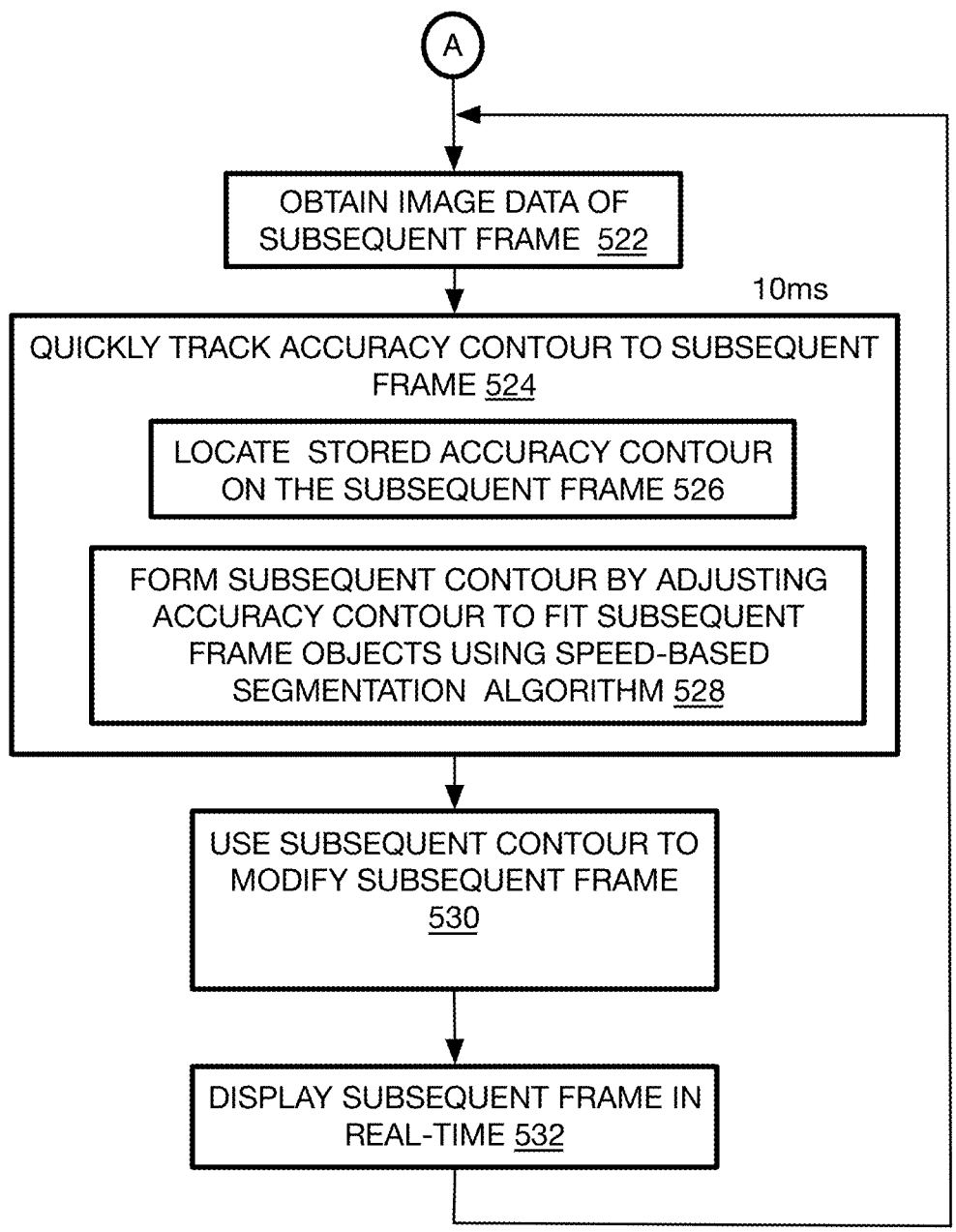

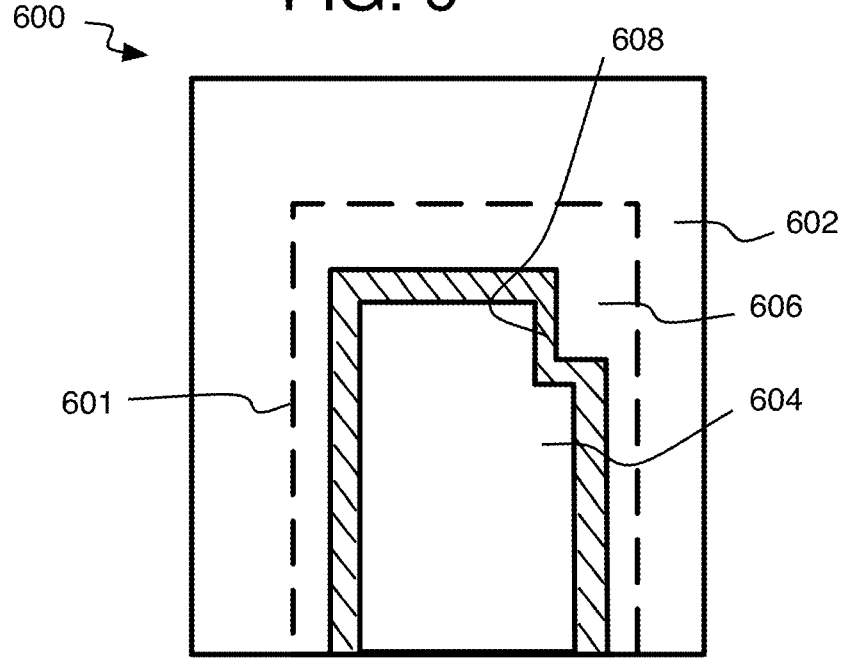

METHOD AND SYSTEM OF REAL-TIME IMAGE SEGMENTATION FOR IMAGE PROCESSING

BACKGROUND

When an image or scene is captured on a camera or provided on some other electronic device or computer as a digital image, it can be desirable to modify the image in ways that require the device to segment foreground objects in the image from the background. For example, a user may want to change the background in the image for entertainment reasons, practical reasons such as to replace the background of a person speaking in a video conference to provide a background more appropriate or less distracting for business purposes, or artistic reasons. One such example of this is color pop where a foreground object is placed in color and the background is kept in black and white so that the foreground object is emphasized.

Also, it is sometimes desirable to modify the foreground in an image in real-time and on a preview screen of a camera for example as a scene is being recorded, such as to place emphasis on objects on a preview screen with the color pop by one example. This may be desirable for real-time applications such as with security and surveillance, video communication including tele-conferencing, computer vision, object recognition and augmentation, medical imaging, video coding efficiency, artistic or entertainment reasons, and others. Segmentation between background and foreground objects is used in object tracking to keep track of the objects from frame to frame in the video sequence during these real-time applications. Some precise segmentation algorithms are accurate but are often too slow for real-time applications such that a pause in the video can be noticeable to a user, and other segmentation algorithms are fast but can often be too inaccurate over time such that an error becomes more and more noticeable for each video frame analyzed by the faster segmentation algorithm.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a time chart of multiple threads processing image segmentation to show a conventional objecting tracking process;

FIG. 3 is a flow chart showing a method of real-time image segmentation for image processing in accordance with the implementations herein;

FIGS. 5A-5B is a detailed flow chart of a method of real-time image segmentation for image processing in accordance with the implementations herein;

FIG. 6 is a schematic diagram of a frame being segmented according to the implementations described herein;

DETAILED DESCRIPTION

Figure 1:
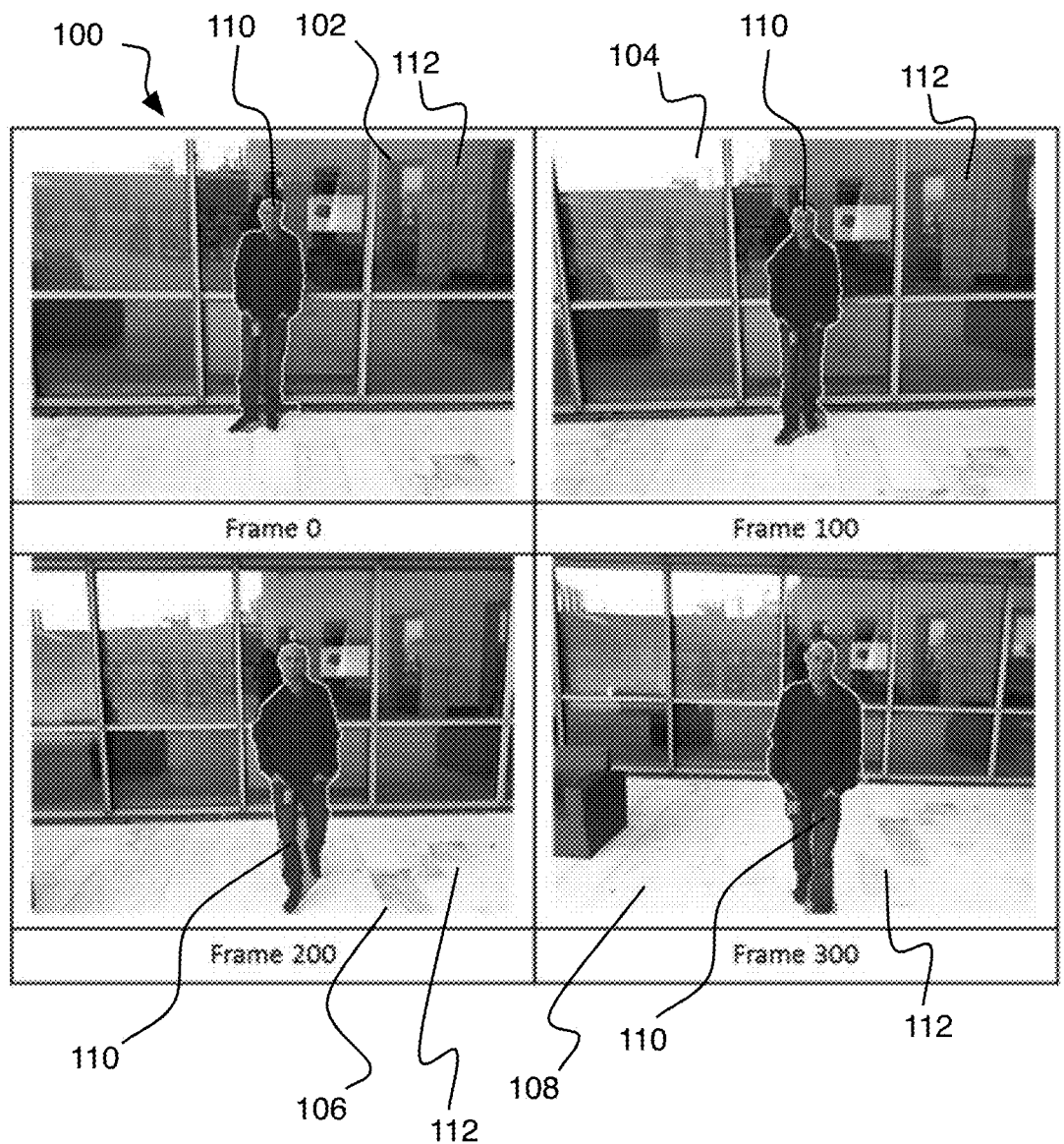
FIG. 1 is an illustration of frames in a video sequence that have a foreground object enhanced using object tracking to explain the implementations herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof consistent with the threads when used as described herein.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide real-time image segmentation for imaging processing.

Referring to FIG. 1, object tracking from frame to frame may be used for many applications that operate in real-time such as security and surveillance, video communication including tele-conferencing, augmented reality, medical imaging, artistic reasons, entertainment reasons, object recognition, medical imaging, video coding efficiency, and many more. As one example, a ten second video sequence 100 is modified with color pop to emphasize a foreground object 110 with a changed color (to red) on a background 112 taken at 30 frames per second. Four frames of the sequence 100 are shown with a first frame (102) at time t=0, another frame (104) at time t=100, a frame (106) at time t=200, and a frame (108) at time t=300. The foreground object 110 remains a different color from frame to frame even when viewed in real-time so that it is easily noticed, and ideally the color is placed only on the foreground object and does not leak onto any background parts.

Object tracking is used to track the segments from frame to frame. One way to locate a moving object over time and from frame to frame in a video sequence is by using segmentation of the objects in the image which includes determining the exact boundary (or contour) between the segments in the frames. One way to do this is to use motion estimation techniques such as parameterized active contour which is a fast algorithm that is capable of providing segmentation of objects quickly so that sufficient time remains to perform modifications of the segments and that can be shown on images in real-time. An initial segmentation with a border between segmented objects is formed for the frame, and the active contour algorithm is used to refine the location of the contour on the current frame. The active contour technique, however, has a "drifting" problem and does not recover from errors. Over time, the errors become larger and more noticeable.

In more detail, a parameterized active contour algorithm (or snake model) may be used in computer vision processes such as object tracking, shape recognition and segmentation, and may be the building blocks of many applications such as medical imaging, artistic photography, and so forth. See for example, https://en.wikipedia.org/wiki/Active contour model, which is incorporated herein for its contents on the filing date of this application. The active contour technique forms a deformable contour (referred to as the snake) along the border (or band) between segments, and segments the band by using boundary discontinuities and by minimizing an energy function associated with the contour. This algorithm may incorporate color-based and shape-based forces with a resultant contour that aligns with the visual contour in the image. The energy function is an iteratively minimizing equation where internal energy controls or limits the deformations to the shape of the contour to maintain a smooth contour. Meanwhile, external energy controls fitting of the snake onto the image (or in this case, the border) and pulls the contours toward features such as lines, edges, and/or terminations on the image. Active contour is used due to its performance balanced with its accuracy and robustness. Such an active contour still has been found to be inaccurate resulting in parts of the image that should be part of a background being assigned to a foreground and vice-versa and that becomes worse over time. This occurs due to the limited amount of pixel data and non-exhaustive, limited number of computations typically used by active contour and relative to more robust algorithms. Thus, an error may be generated on one frame, and since a contour on that one frame may be used to form the contour for the next frame, the error may be compounded frame to frame until it becomes very noticeable.

A more accurate segmentation algorithm is called a graph-cut technique. Graph cuts create a network that extends lines from a source node (that represents one segment) to all of the pixels in a region of interest to be segmented, and from a sink node (that represents the other segment) to all of the pixels in the region of interest. Each line or edge is provided with a weight, and the boundary between the segments is determined by cutting the edges (and adding up the weights on the cut edges) to determine a minimum cost to cut through the edges (and/or maximum flow through non-cut edges). There are many different algorithms for determining the weights of the edges. Some are mentioned in en.wikipedia.org/wiki/Graph_cuts_in_computer_vision.com as one example and which is incorporated herein in its entirety for all purposes. One such popular technique is called Grabcut that generates certain algorithms to generate the weights and does so in a number of iterations that result in a convergence.

Referring to FIG. 2, when working in a pipeline to process the segmentation in threads feeding instructions and data to a processor, a few frames shown here may be processed in parallel by a graph cut algorithm. Every time a thread finishes the processing of a frame including the segmentation when needed, the resulting frame is displayed. For example, time chart 200 shows a case with three threads A, B, and C handling different consecutive frames from a camera and including frames i−2 to i+3 that each may be captured at about 30 fps (or about 33 ms per frame) for example, and where each column shown represents the time of capture of another frame or about 33 ms. Ideally, a frame is captured and displayed within one period (one column) but is still not very noticeable when processing extends up to 66 ms. Three periods, or 99 ms, does generate a noticeable delay to a viewer or user. As shown by the arrows "accurate tracking frame (frame #)", the graph-cut analysis uses about 70 to 100 ms from obtaining the image data, segmentation, image modification, and display. Even when only 70 ms is used and only 4 ms of processing extends into the third period, once the 66 ms time is reached and processing extends into the third period, the entire period is considered used, and no segmentation processing can start for the next frame until the next period starts. Thus, while graph-cut can obtain close to real-time processing and display, the noticeable delay is still present. This is shown here on time chart 200 since by the time that thread A finishes processing frame i−2, the retrieved new frame is i+1 which is three frames later, so the end-user very well may notice the delay.

To resolve these issues, the present method and system combines two existing tracking or segmentation algorithms, one faster than the other, and the other more accurate than the faster one, and in a pipeline-like way using multiple threads. This enables generation of accurate segmentation contours that divide the segments in an image and in real-time, while overcoming occlusions and abrupt and/or fast movements of the objects in the image or the camera. An occlusion is an artifact that causes a gap of pixels with the wrong color and/or luminance values on an image often due to at least one camera that did not properly capture the data of an area on the image (such as an edge of an object) in a 3D stereo system with multiple cameras. The segmentation algorithm that is considered more accurate but relatively slow will be considered the accuracy-based segmentation algorithm such as graph-cut by one example, while the segmentation algorithm that is considered faster than the accuracy-based segmentation algorithm albeit less accurate may be considered the speed-based segmentation algorithm. The advantages here can be accomplished by using the accuracy-based segmentation algorithm to determine a relatively accurate segmentation contour on one frame (on a prior frame), and then placing that contour on a newer subsequent frame just received. The speed-based segmentation algorithm can then be applied to the copied prior contour to adjust the contour on the subsequent frame and create a final or subsequent contour that is very accurate but still permits the subsequent frame to be modified and displayed within a single period of processing so that it is displayed in real-time even though the subsequent frame is visibly modified.

In order to clarify the process, the following terms will be used consistently as follows. A previous (or early or earlier) frame may have a previous or early contour that is to be tracked to a prior frame to form a prior contour by using accuracy-based segmentation algorithms. The prior contour then is used to track to a subsequent frame to form a subsequent contour using speed-based segmentation and so that the subsequent frame can be displayed in real-time. Herein, the term previous is relative to the prior frame, and the term prior is relative to the subsequent frame unless context indicates otherwise. Thus, throughout the methods described herein the terms previous (or early of first), prior (or also middle or second), and subsequent (or third) refer to three different times in that order but not necessarily consecutive.

Referring to FIG. 3, process 300 is provided for a method of real-time image segmentation for image processing. In the illustrated implementation, process 300 may include one or more operations, functions or actions 302 to 306 numbered evenly. By way of non-limiting example, process 300 may be described herein with reference to example image capture processing system 800 of FIG. 8, and where relevant.

Process 300 may include "obtain image data of a plurality of frames of a video sequence comprising a prior frame and a subsequent frame relative to the prior frame and in display order of the video sequence" 302. As explained below, this may include obtaining raw data of pixels as being recorded in a video sequence and in a color space (such as RGB, YUV, and so forth), and pre-processing raw image data sufficient for segmentation. The result may be obtaining color and/or luminance values per pixel for each frame, and also may include gradient maps, histograms, depth maps, and other image-based data. Also, the prior frame is not necessarily consecutive to the subsequent frame in the video sequence, and by one form, the prior frame is two frames apart where there is one frame between the prior and subsequent frames, but could be more.

The process 300 also may include "use an accuracy-based segmentation algorithm to determine a prior contour separating segments on the prior frame" 304. As explained in greater detail below, this may refer to using the accuracy-based segmentation to track a contour from a first or earlier frame to another frame that is being referred to as the prior frame (and prior relative to a subsequent frame introduced below). Specifically, an initial segmentation may be performed on a first or earlier frame that generates at least a tri-map of that frame including an accurate location for an unknown region between two segments. The initial segmentation may or may not further include a complete segmentation to finalize an initial contour for that earlier or previous frame. Then, once the prior frame is obtained, that previous contour from the previous frame then may be placed on the prior frame. The accuracy-based segmentation algorithm then may be applied to the unknown region (or previous contour) to modify the previous contour on the prior frame. When the next frame is received, the prior frame then may become the earlier frame to track its contour to the next frame (or next prior frame). By one form, as the frames are obtained consecutively, each consecutive prior frame is analyzed on a different thread. Also, at this point, the contour of the prior frame is merely used as a preliminary contour for a subsequent frame described below, and the prior frame is not modified and displayed based on the prior contour. At a minimum, accuracy-based refers to a segmentation method that is more accurate but slower than a speed-based segmentation method. By one example, the accuracy-based segmentation algorithm is a graph-cut type of algorithm.

Process 300 then may include "use a speed-based segmentation algorithm applied to the prior contour located on the subsequent frame to determine a subsequent contour on the subsequent frame to be used to modify or display or both the subsequent frame" 306. Now, as soon as a subsequent frame is obtained, which by one form is two frames after the prior frame, the prior contour from the prior frame is placed on the subsequent frame. The speed-based segmentation algorithm, such as active contour algorithm by one example, is then used to reshape the prior contour on the subsequent frame to match the edges of the objects on the subsequent frame and form a subsequent contour. The subsequent contour then can be used for object tracking or other applications to modify the subsequent image to enhance the image as mentioned herein, such as with color pop. The active contour algorithm can be applied very fast so that sufficient time exists to modify and display the subsequent frame within a single frame period (at 30 fps for example) providing good quality real-time modified frames. When this is applied over numerous threads, consecutive frames of the video sequence can be displayed in real-time. While an individual prior frame is not displayed based on its own prior contour, the individual prior frame does have its turn as a subsequent frame with another frame acting as a prior frame and on a different thread than the thread using the individual prior frame as a prior frame to support another subsequent frame.

Also with this arrangement, and by one example, only the accuracy-based segmentation contours (the prior contour) for example is placed on another frame to be revised by another segmentation algorithm. The speed-based segmentation contours (the subsequent contours) are used on the current real-time frame the subsequent contour is formed, and this speed-based contour is not placed on another frame (at least not for segmentation purposes described herein). Thus, despite any error in the speed-based segmentation algorithm, the system recovers quickly since the next real-time frame is based on another accuracy-based segmentation algorithm (another prior contour) and the error of the speed-based segmentation algorithm cannot be carried forward and compounded. This reduces or eliminates error drift as can happen with the active contour algorithms. This also is explained in greater detail below.

Figure 4:
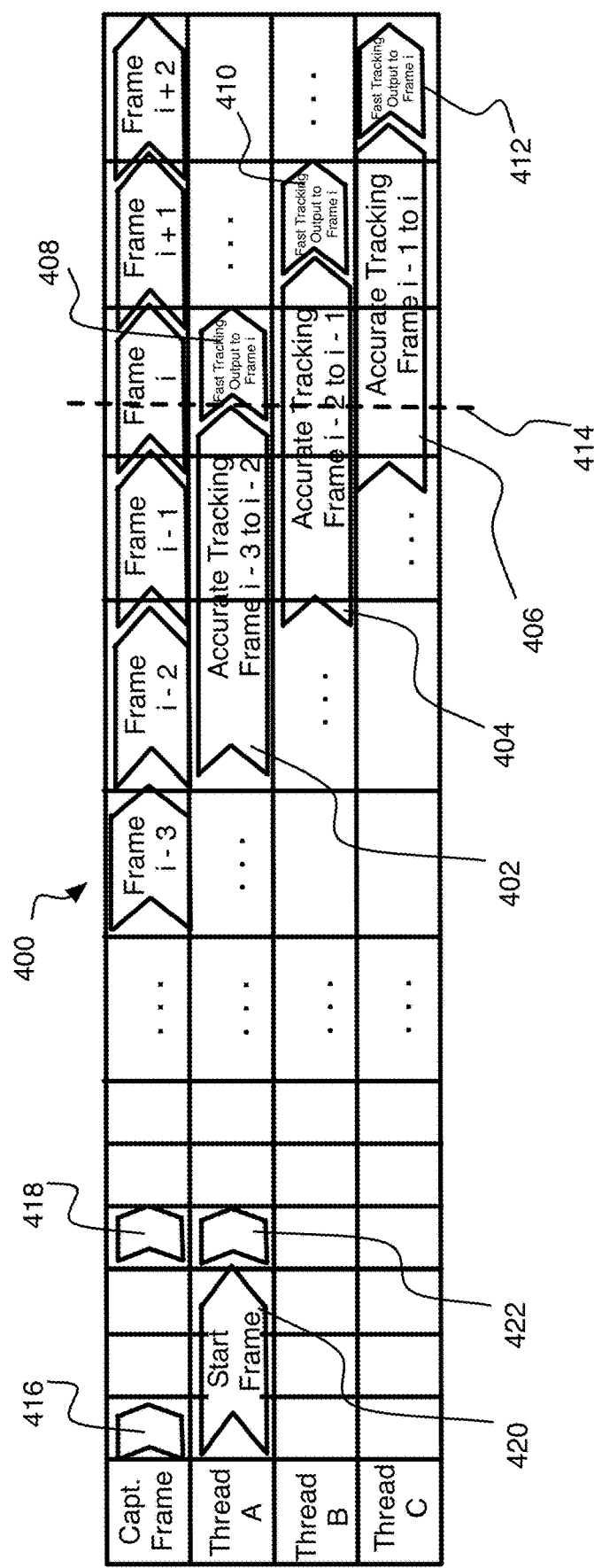
FIG. 4 is a time chart of multiple threads showing a process of real-time segmentation for the implementations described herein.

Referring now to FIG. 4, and to provide more detail, a time chart 400 is provided showing real-time segmentation processing on threads A, B, and C for the implementations described herein. The time chart 400 will be used to explain process 500 (FIGS. 5A-5B) below. Basically, time chart 400, as with time chart 200, has a row for the processing of each thread A, B, and C, and a row to show the captured frames from a start frame 416, a frame captured after the processing of the start frame 418, and then consecutive frames i-3 to i+2 are shown where each column represents a time period for capturing a frame such as about 33 ms for 30 fps. Time moves from left to right so that earlier or prior frames are on the left of the chart and are received before later or subsequent frames toward the right of the chart. The arrow 420 shows the time period for processing the start frame which is explained in detail below and, by one form, provides a full, accurate segmentation that can be used to display the start frame as well as to provide an accurate initial contour to be used by later frames. The arrows 402, 404, or 406, titled "accurate tracking frame [W] to [X]" indicate, among other things, the period of time that the system obtains and pre-processes image data of frame X, places a previously determined contour, or unknown region, of earlier frame W onto frame X, applies accuracy-based segmentation algorithm(s) to the contour, and forms a prior contour (on the prior frame X) as an output to be used by a subsequent frame [Z], the processing of which is indicated by arrows 408, 410, or 412 respectively. The arrows 408, 410, and 412 are titled "fast tracking output to frame [Z]", and indicate, among other things, the time to retrieve a subsequent frame [Z], place the prior contour on the subsequent frame [Z], modify the prior contour using the speed-based segmentation algorithm to form a subsequent (or final) contour, use the subsequent contour to modify the image data when performed, and then display the image. By one example, at the time marked by the dashed line 414, the frame captured by the camera and retrieved at that time is frame i (so i=Z for thread A here). Thread A finishes processing frame i-2 (frame X) so that the prior contour is placed on frame i, and the speed-based segmentation algorithm can be used to move the prior contour of the accurate tracker output to a new subsequent contour formed on frame i (frame Z). The speed-based segmentation algorithm is relatively fast so that the processing finishes quickly, and a modified image may be ready for display in real-time to a user without noticeable delays all calculated during the time period for the latest frame "i". This is repeated along each thread where the threads are used as they become available. The processing arrow 422 for the frame 418 after the start frame 416 also may also be considered a frame Z for speed-based segmentation. Other details are explained below.

Figure 5A:
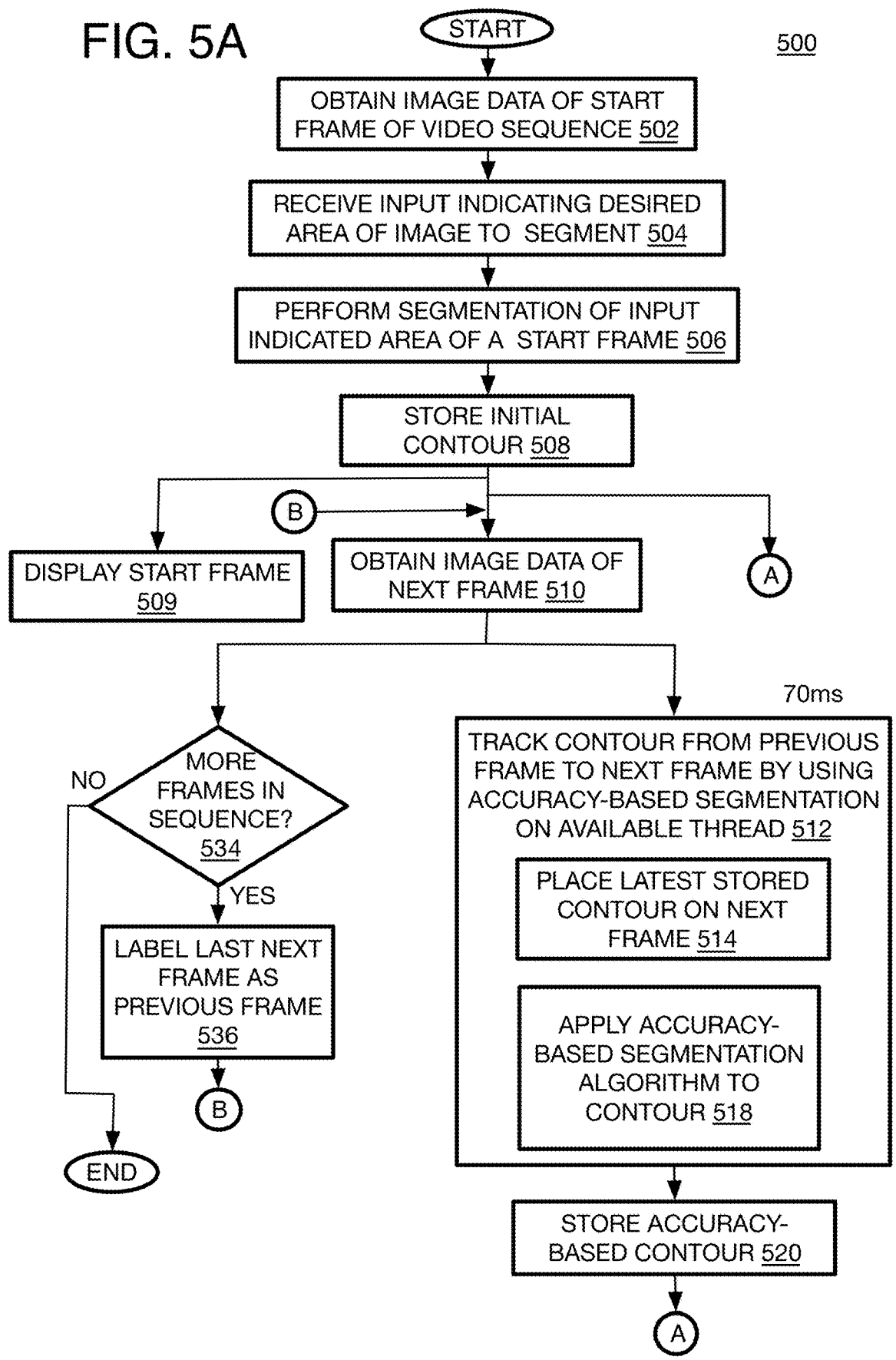

Referring to FIGS. 5A-5B, a process 500 is provided for a method of real-time image segmentation for image processing. In the illustrated implementation, process 500 may include one or more operations, functions or actions 502 to 532 numbered evenly. By way of non-limiting example, process 500 may be described herein with reference to example image processing system 800 of FIG. 8, and where relevant.

The present method 500 uses the existing accuracy-based segmentation algorithms to overcome major changes in a scene or recover from occlusions for example. On the other hand, a speed-based segmentation algorithm is used after the use of the accuracy-based segmentation to allow the segmentation results to be obtained and used to modify the image with sufficient time to display the images in real-time. By this arrangement, the present method breaks the long-standing trade-off between accuracy and run-time, allowing applications to obtain accurate results in real-time scenarios. Even though the segmentation will work in real-time without noticeable delay, the system also can quickly overcome abrupt fast movements of the object or the camera, and can recover from occlusions. The details are as follows.

Process 500 may include "obtain image data of start frame of video sequence" 502. Preliminarily, this may include capturing images with a video camera that provides a video sequence of images at 30 fps or other rate for example, and provides the images while, or in parallel to, the images being processed for display including the segmentation processing described herein. This operation also may include obtaining the frames in the form of pre-processed raw image data with RGB, YUV, or other color space values in addition to luminance pixel values for each of the images in the video sequence. The color and luminance values may be provided in many different additional forms such as gradients, histograms, and so forth. The pre-processing could include demosaicing, noise reduction, pixel linearization, shading compensation, resolution reduction, vignette elimination, and/or 3A related operations including automatic white balance (AWB), automatic focus (AF), and/or automatic exposure (AE) modifications, and so forth.

Optionally, this operation also may include obtaining depth data when the depth data is used for segmentation analysis. Depth image data may be determined by a stereo camera system, such as with RGBD cameras, that captures images of the same scene from multiple angles. The system may perform a number of computations to determine a 3D space for the scene in the image and the depth dimension for each point, pixel, or feature in the image. Otherwise, other ways to determine three dimensions from a single camera are possible such as time-of-flight, and structural or coded light technologies. Other operations that may be considered as part of obtaining the image data is planar detection to reduce the computational load of initial segmentation by efficiently grouping pixels located on the same plane so that each plane is treated as a single component to be placed in a single segment. This operation may be performed by known planar detection methods such as Hough Transform, Random Sample Consensus (RANSAC), or others.

As shown on time chart 400, the frames may be received in real-time and are then to be processed as the frames are received ideally to display the frame before the next frame is received. Real-time here may actually mean close to real-time sufficiently fast so that the display of the video sequence on a screen as the video recording is being displayed appears to be instantaneous to a person viewing the video sequence. As mentioned, this may occur when a frame is displayed within one or two frame time periods (such as about 33 ms each when recorded at 30 fps) including the time period the image data of the frame is received. Thus, a received frame i should be displayed by the end of the frame i time period or the immediately next frame i+1 time period in order to ensure it appears the video is being displayed to a person in real-time.

By one approach, a start frame 416 (FIG. 4) of a video sequence is segmented to generate an initial (or early or previous or first) contour that can be the first contour tracked to another frame of the video sequence. A video sequence may be a single scene in a larger video where the image does not change significantly from frame to frame, and there may be a number of video sequences in a single video in this case. However, this need not always be the case because the present methods recover quickly from large image changes from scene to scene for example relatively quickly as explained below. Thus, there may be a single start frame for an entire video (the video is considered to have only one video sequence for the methods herein). Also, the start frame need not be the first frame in a video sequence or scene, and may be described as the frame (or frames) used to indicate the area of the image that is to be segmented. This also is explained in more detail below.

Referring to FIG. 6, process 500 may include "receive input indicating desired area of image to segment" 504. Thus, by one form, the method is initiated once the area of the image to be segmented is established. This may include obtaining the location of at least one boundary 601 shown in dashed line that defines a boundary box 606 on an image or frame 600, which is located to select an area (or foreground 604) of the image to be segmented from a background 602. An unknown region or contour 608 divides the foreground 604 from the background 602 and is generated by the segmentation explained below. A set boundary initially may be established manually by a user or automatically. For example, a user may place the set boundary 601 on the image by writing it on a touch sensitive screen or otherwise by manipulating a cursor or by other devices with a display screen. By another form, a system may automatically form the set boundary 601 for segmentation such as for applications with a certain purpose such as a face detection application, and so forth. By yet other forms, the set boundary may be omitted altogether especially for automatic processes that perform the segmentation for computer vision or video coding efficiency and so forth that will segment objects throughout the entire image.

By some examples, the system performing the processes herein may use settings based on the assumption that the outer boundary 601 (or bounding box 606) will be set so that the largest object in the boundary is to be part of a foreground mask (the terms foreground and foreground mask may be used interchangeably herein). This is typical when attempting to use a person or group of people as the foreground, or an image of a certain single object such as car. Many variations are possible.

In one example form, the segmentation may be used for a contour tracking mechanism for artistic preview-mode in an RGBD camera. In this example use case, a user is choosing an object in a camera application while in preview mode, and an artistic filter is to be applied over the user selected object and not over the background (color pop effect for example, where the background is black and white and the object is in color). In this form, the selected boundary 601 may or may not really have a rectangular shape and may or may not be visible to the user. By one form, the initial segmentation may appear instantaneous to a user by using the initial segmentation to assist the user to select which object is to be segmented from the background going forward in the scene. Thus, to a user, the initial segmentation may be so fast that it appears that the exact boundary of the object selected (or the object itself) is changed to a different color or otherwise modified to confirm the selection to the user (who may have touched the image at the object to select the object for segmentation). Many variations are possible.

Process 500 may include "perform segmentation of input indicated area of a start frame" 506. An initial segmentation is being computed using the user or automatically set boundary box 606 as the area for segmentation on frame 600 which may be start frame 416 on time chart 400. As mentioned, it could be the entire image that is to be segmented instead. This operation may include using the image data to generate initial segments, such as foreground and background segments to name one example. The segmentation first may be provided in the form of a binary segmentation map. The segmentation map then may be used to set a border area such as an unknown region or narrow band extending along the border between the initial segments forming a tri-map with an unknown region so that a more precise segmentation can be applied within or at the unknown region rather than the entire image. Thus, by one technique, an initial, rough segmentation is performed, and a narrow band is set at the border between the segmentations. A separate more precise algorithm is then used to determine the segmentation of the pixels within the band to provide a final refined (or here initial or early) segmentation. Such a method that uses an unknown region provides significant segmentation accuracy with real-world color images with complex color arrangements as long as the initial input resides close to the desired output as when limited to an unknown region that is a narrow band at the border of the segments.

The initial rough segmentation before the unknown region is set may be performed by color-based analysis, depth data analysis, object detection, or even by tracking object's contour from previous frames (when not the start frame) to name a few examples. Thus, the process may use other object recognition techniques (edge corner detection and so forth) for the rough segmentation or may in fact use known object tracking segmentation where the present methods are applied after a frame that is considered to have the initial segmentation needed to initiate the present method.

Whether used as a rough segmentation for the start frame, or as the only segmentation algorithm to be applied on the start frame, the color (and/or intensity) based methods may include a graph-cut method (such as Grabcut), Deep-Learning methods (based on convolutional neural networks for example), or class specific methods, such as an algorithm which is segmenting at the rough boundary of an object such as a person rather than using a rectangle. The algorithms for finding the exact boundaries of the person are slower than the ones which only detect a bounding box of the person. A conventional depth data analysis background-foreground segmentation may use a weighted combination of the color and depth data of the pixels to determine whether the pixels are part of the background or the foreground. See for example, Blanc-Talon et al., *Extended GrabCut for 3D and RGB-D Point Clouds*, Proceedings at Advanced Concepts for Intelligent Vision Systems, 15th International Conference (2013), and Hickson et al., *Efficient Hierarchical Graph-Based Segmentation of RGBD Videos*, Proceedings of IEEE Conference on Computer Vision and Pattern Recognition (CVPR) (2014). These methods describe a graph cut approach that is extended by creating node weights based on both RGB and depth. These methods attempt to "fuse" depth and color information at a low level for an entire area that is to be segmented. Other methods may use depth data alone for determining a rough or initial segmentation that forms the narrow or unknown bands, and then uses color and/or luminance data to perform the more precise segmentation at the unknown regions. Such a technique is disclosed by U.S. patent application Ser. No. 14/925,057, filed Oct. 28, 2015, which is incorporated in its entirety herein for all purposes. Many other variations are possible.

The setting of the unknown region may simply include providing the rough binary segmentation map of the entire image that indicates a border between two segments and to a function to find and set the unknown regions, and the initial contours within the unknown regions. Thus, this may be performed without actually first identifying unknown regions although that is the effect of the function. By some alternatives, the unknown regions of an image may be identified manually or automatically by analyzing the initial rough segmentation map by a separate algorithm or module than a function used to perform contour identification. In this case, the setting of the unknown region may be performed by such techniques similar to parallel curve or other similar shaping techniques (see for example, en.wikipedia.org/wiki/Parallel_curve). Otherwise, functions used to perform contour identification and contour type classification may be used to set the unknown region such as the openCV find contour function. See, for example, the find contour function as described by: http://docs.opencv.org/2.4/modules/imgproc/doc/structural_analysis_and_shape_descriptors.html#findcontours, and Suzuki, S. and Abe, K., Topological Structural Analysis of Digitized Binary Images by Border Following. CVGIP 30 1, pp 32-46 (1985). Thus, the initial segmentation map of the entire image (or parts of the image where segmentation is desired) is provided to the function, and the function extracts all the contours of the image.

The unknown region or narrow band may extend half into one segment (the background side) and half into the other segment (foreground side), although variations could be used as well. The unknown region alternatively may have a varying width as well. The initial input in a narrow band is not far from the desired output and so can be treated differently. Specifically, rough contours within the unknown region may be the input to a more precise algorithm relative to depth-based or other algorithms used for the rough segmentation such as, by one example, the active contour algorithm that asserts a penalty to any change from the initial set such that points shifted outside of the unknown region are ignored, but a maximum distance limit within the region is not enforced either. As mentioned, however, a precision graph-cut or other type of algorithm could also be applied to the unknown region to generate an initial contour (or more precise unknown region location) that is to be used as an initial basis for segmentation in the following frames. By one example, the unknown region width may be fixed, and is set at about or exactly 10 pixels wide, and this width may be maintained for the length of the initial rough segmentation.

As to the form of the resulting initial contour (or unknown region), the components (or objects or segments) may be represented by a full matrix or initial segmentation mask such as a binary segmentation map that shows where adjacent pixels have different segments. A border contour then is formed by the pixel sides or edges between those opposite pixels. By another way, the contours are listed as a series of junction coordinates. Particularly, a single long contour actually may be formed of many small contours. Thus, adjacent segments (object or component or shape) may have its pixels labeled with a different value (0 or 1) for each separate contour within the unknown region. This may include a representation that may be referred to as the "minimal representation" because it is the minimal count of pixel points (such as five) to fully represent a rectangular shape. Specifically, the initial segmentation may result in a segmentation map or binary map that labels each or numerous pixels with a 0 or 1 to indicate which segment the pixel belongs. The initial contour may be in the form of a tri-map or mask as the result of the initial segmentation, and that indicates the location of the unknown region as well as the initial contours within that unknown region. Many variations are possible.

Process 500 may include "store initial contour" 508, where the initial contour of the start frame is accessible for later use, and may be stored in RAM, cache, or other memory as mentioned below. This operation stores the most update and accurate contour so far. By one form, a single most accurate contour is maintained as it is updated in memory for the entire video sequence no matter which thread is using the contour. In this case, the stored contour is being updated across the threads and it is assumed the frames using the stored contour are in sufficient close proximity in the video sequence to usually have similar images. By another option, each thread has its own stored updated contour (or prior contour or intermediate mask) so that each thread uses different prior contours than that used by any other thread. Thereafter, the initial contour, since it is an accurate contour, may be used immediately on the next captured subsequent frame 416 for example to display the subsequent frame in real-time as shown by arrow 422. The process of segmenting, analyzing, and displaying the subsequent frame (operations 522 to 532) are explained in detail below with a later loop in the process.

Process 500 also optionally may include "display start frame" 509 when the segmentation and processing of the start frame 416 is complete for display. This may occur over a number of frame time periods as shown by arrow 420 on time chart 400. This also may be considered slower processing, but this is used so that pauses in the remainder of the video sequence will be limited or eliminated due to the segmentation. Typically, a user will not notice the delay of the start or initial frames due to some notice or effect being displayed to the user while initiating the video sequence display in the background of the application.

Otherwise, the process 500 may continue by using the initial stored contour as an early or previous contour to be modified on a next frame by accuracy-based segmentation. Particularly, process 500 may include "obtain image data of next frame" 510. The frames going forward may be obtained in the captured and pre-processed form as mentioned above, where the time of the image capture is represented by the arrow end (or left side of the time period) as shown on time chart 400.

It will be understood that this operation also may refer to obtaining the image data of a frame that is being simultaneously processed as a subsequent frame or has already been processed as a subsequent frame. In other words, a single frame may be processed on two different threads for two different purposes, one for real-time display of that frame using speed-based segmentation, and another for using the frame to generate an accurate prior contour using the accuracy-based segmentation.

For the purposes of this example, the next frame here may be frame i–3, and may be the next frame captured after the initial or previous contour is placed in memory. By one form, frame 418 is both displayed in real-time as a subsequent frame and used as the frame i–3 to provide a further accuracy-based segmentation. Regardless, a frame (i–3), captured after the initial contour is stored, could be any number of frames after the start frame although errors may be more evident if too many frames exist between the start frame and the next frame.

With frame i–3 as the next frame, process 500 may include "track contour from previous frame to next frame by using accuracy-based segmentation on available thread" 512. This is not shown on time chart 400 yet, but continuing the example, this involves considering the start frame as the previous frame and using the initial contour (also referred to as the unknown region location as mentioned) which may be in the form of a tri-map or mask as the basis for the segmentation contour on the next frame (here i–3). This assumes that there are small changes or little motion in the segments from one consecutive frame to another frame so that the contour from an earlier frame can still be used on a later frame to at least generally match positions of the segments on the later frame. Going forward, the use of a contour also may refer to the use of an unknown region for simplicity. Also, the handling of large changes from frame to frame is described below.

For this operation, process 500 provides "place latest stored contour on next frame" 514. Continuing the example, at this point this may include placing the stored earlier (or initial or previous) contour at the same location on the next image (i–3) as the location on the initial frame, and then the process 500 may include "apply accuracy-based segmentation algorithm to contour" 518" which tracks the initial (or previous) contour from the start frame to frame i–3 so that an accurate prior contour is generated on frame i–3. This determines where the prior contour should be placed in the new next frame (i–3) by modifying the previous contour on the next frame in order to place the prior contour along the edges of objects in the frame i–3. This may use an available thread from a thread pool for example.

Also as mentioned above, the accuracy-based segmentation algorithm may be based on graph-cut, and many different techniques may be used for determining weights and the minimum cost and/or maximum flow, including many different extensions or variations including Grabcut, variations that use depth data, and so forth. A number of these techniques are mentioned above. By one form, the accuracy-based algorithm is only applied to the unknown region or near the initial contour to be modified. This calculation takes approximately 70 ms by one example approach.

Then, process 500 may include "store accuracy-based contour" 520, now also referred to herein as the prior contour when the contour is to be placed on a subsequent frame for speed-based segmentation. Thus the prior contour (of frame i–3) is now placed in memory and may replace the initial or previous contour as the latest most up-to-date and current contour. It will be understood that instead of replacing the initial contour, the initial contour (and/or one or more other contours that are generated) could all be kept as back-ups in case a new contour is lost or unusable. As mentioned, a current contour could be saved, updated, and used for each thread, or a single current contour is saved, updated, and used across multiple or all threads.

Process 500 may include "obtain image data of subsequent frame" 522. Thus, the process may continue again with operations 524 to 532 to segment and display a subsequent frame in real-time. The image data of a new captured frame such as frame i–1, may use the prior contour in storage to generate a subsequent contour on the subsequent frame i–1 so that the subsequent frame i–1 can be shown in real-time (also not shown on time chart 400). Again the details of this operation on the subsequent frame (operations 524 to 532) are described below and may be performed on one thread while the frame i–3 is used as a previous frame and the prior contour of frame i–3 is being tracked to another subsequent frame on another thread.

Specifically, and turning to operation 534 where the process 500 catches up to that shown expressly on time chart 400, the process 500 may include "more frames in sequence?" 534, and if not, the process ends except for those frames already being analyzed and to be displayed, but if so, process 500 may include "label last next frame as previous frame" 536. Thus, now frame i–3 has its prior contour now labeled as the previous contour being stored as the most up-to-date contour, and frame i–3 is now labeled the previous frame. The operation then loops to obtain another next frame (now frame i–2). As shown by arrow "accurate tracking frame i–3 to i–2" on time chart 400, operation 512 is repeated to perform the accurate tracking and may include placing the previous contour from the memory (514) onto the next frame i–2, and performing (516) the accuracy-based segmentation algorithm such as graph-cut or similar techniques mentioned herein. The resulting accurate contour of frame i–2 is referred to as the prior contour and is stored (520) to be used to form a subsequent contour on a subsequent frame. Again, this prior-contour of frame i–2 may replace the previous contour of frame i–3 in memory or whatever contour is in memory when multiple threads are being used and the threads share the same single contour of the memory.

Thereafter, process 500 again includes "obtain image data of subsequent frame" 522 and continuing the example, frame i is now obtained as described above for obtaining any frame. Here, however, the subsequent frame segmentation analysis may include "quickly track accuracy contour to subsequent frame" 524 in an operation there merely consumes about 10 ms to maintain a real-time rate. While this is now described with frame i as the subsequent frame, this same process was previously used on subsequent frame 418 and i–1 as mentioned above. This operation may include "locate stored accuracy contour on the subsequent frame" 526. Here, the prior contour from the memory is placed in the same position on the subsequent frame (frame i) as on the prior frame (frame i–2).

Then, process 500 may include "form subsequent contour by adjusting accuracy contour to fit subsequent frame objects using speed-based segmentation algorithm" 528. Thus, the prior contour is adjusted to form a subsequent contour to reside on the edges of objects in the subsequent frame. By one form, the speed-based segmentation is always performed after the accurate processing on the prior frame so that an error of the speed-based segmentation algorithm cannot accumulate, and even in cases where the speed-based segmentation algorithm fails because of abrupt or fast movement for example, once the camera or image objects stabilize, the system will recover quickly since the accuracy-based segmentation algorithm provides highly accurate segmentation right away after the stabilization.

Specifically, the prior contour is found within a border area or unknown region, and points on the contour are sampled for applying force against those points to shift the positions of those points, and in turn the contour. The active contour algorithm minimizes an energy function associated with a contour. The energy function is an iteratively minimizing equation where internal energy controls the deformations to the shape of the contour while external energy controls fitting of the contour onto the image (or in this case, the border of a segment). A final contour, by its final point positions, is returned as output. One such active contour technique is provided by Mille, *Parameterized Narrow Band Active Contour*, Universite' François Rabelais de Tours, Laboratoire Informatique (EA2101) (http://liris.cnrs.fr/Documents/Liris-4476.pdf). For the present method, 100 iterations may be performed, and by one example with 10 passes at each iteration to a convergence, and after each iteration, the global properties are updated as the color of the foreground and the background.

The internal energy or force of the active contour-type algorithm may be a smoothness energy, and an external energy or force of the algorithm may be a gradient edge force. A region force and a balloon force as well others such as a diffusion force also may be used. Other algorithms have different combinations of weights that may be used as well. The forces are weighted and then summed to obtain a final shift in distance and direction to be applied to a point. In some techniques, the weight of each force is fixed during the evaluation, and particularly during the iterations of the active contour algorithm. By one form, however, the weights that are used to adjust the forces may be dynamic weights that change for individual or each iteration of the active contour algorithm instead of remaining fixed over multiple iterations. Thus, the weights may be updated for individual or each active contour iteration, and then applied to the forces before summing the weighted forces. Such a technique is disclosed by U.S. patent application Ser. No. 15/041,024, filed Feb. 10, 2016, which is incorporated herein in its entirety for all purposes.

Process 500 may include "use subsequent contour to modify subsequent frame" 530, and as mentioned, the segmentation then may be used to modify the image such as with some desired filter, such as with color pop to color a foreground object while maintaining a background in black and white, blurring, oil painting, pencil sketch, posterization, and/or water color, just to name a few of many possible examples. Thereafter, process 500 may include "display subsequent frame in real-time" 532. Thus, the result of the subsequent frame processing is received and returned immediately to the user on a display, such as a preview screen for example. When the processing is finished, the thread being used is free to be used for other tasks in the thread pool, and the process loops back to obtain the next subsequent frame for processing.

It will be understood that the subsequent frame is not captured immediately after the prior frame places its prior contour into memory, but that one or more frames may be skipped. These frames are not skipped entirely, but are merely displayed in real-time from other threads. Thus, as mentioned, while frame i-1 is skipped on thread A, it will be displayed in real-time from thread C and as already described above as shown, as a subsequent frame where the prior frame was frame i-3. Also, while time chart 400 shows that frame i-1 is used as the previous frame for accuracy-based segmentation on thread C as well, this will not always be the case and depends on how many threads are being used for the video sequence.

Meanwhile, as the process 500 is performing the accuracy-based and speed-based segmentations, the process 500 also obtains more frames as indicated by operation 534, and when a next frame is to be obtained, by labeling the last next frame as the previous frame 536. The process then loops to perform the tracking for the next frame, and in the present example, tracking frame i-2 to i-1. It should be noted that since thread A is occupied with tracking frame i-3 to frame i-2 at this point, thread B picks up the task of the new tracking of frame i-2 to i-1, which may be assigned through the thread pool. The process then continues as described and loops in this manner until no more frames in the video sequence are left to analyze and display.

As mentioned, when an abrupt or large movement takes place, at first the segmentation may be inaccurate especially as the camera or objects move too quickly in a non-stable manner for the segmentation. This is often at a speed where the camera or the image in the frame is moving too fast for a person to focus on the image anyway. Thus, once the camera or objects in the image stabilize, the system recovers very quickly since the accuracy-based segmentation operates on a single pair of frames with a new start frame, and has robust computations that can determine the correct segmentation at least relatively quickly albeit not at real-time at first, and does not rely on speed-based segmentation that might rely on a previous inaccurate contour.

Figure 7:
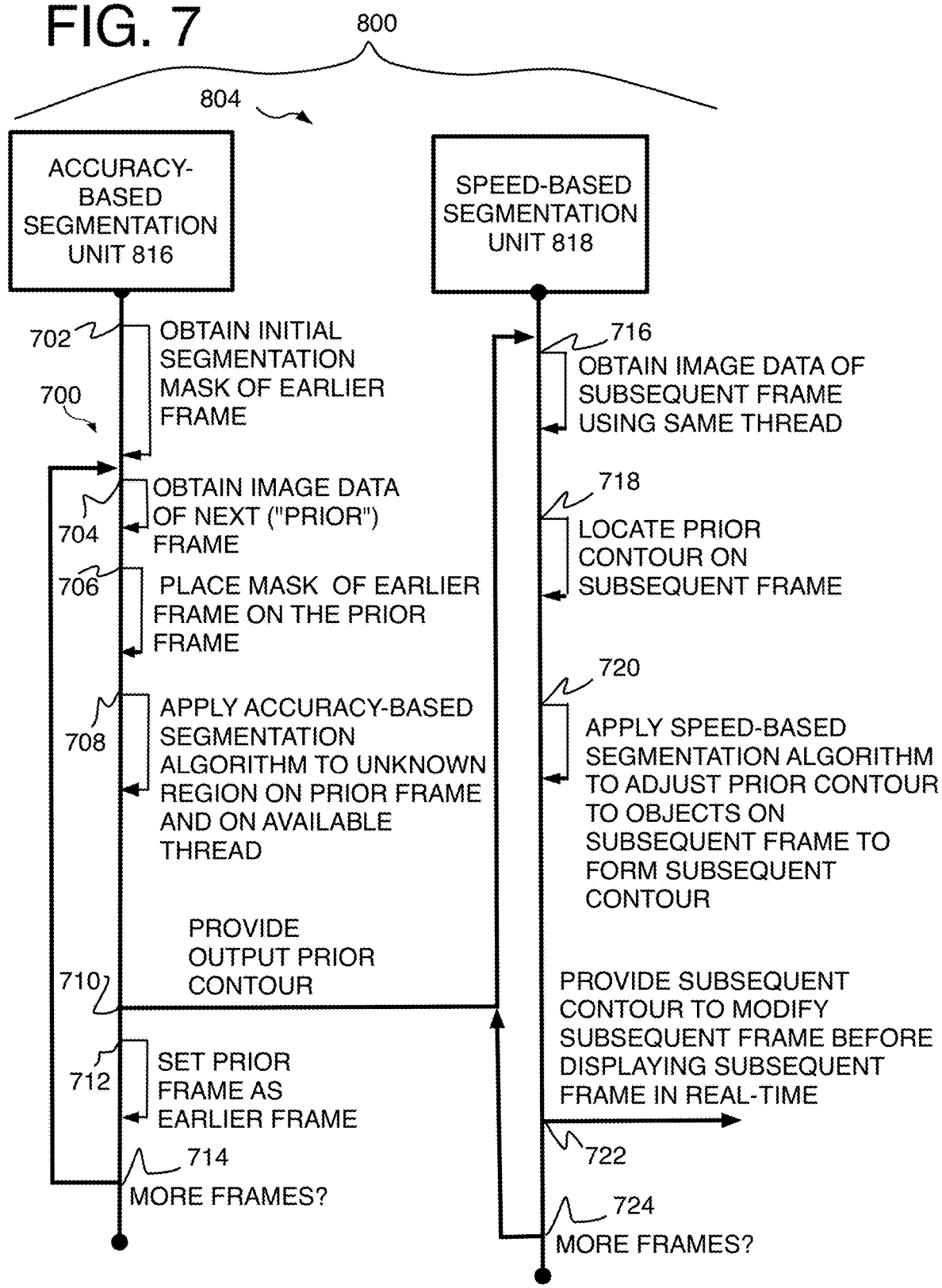
FIG. 7 is a diagram of the real-time image segmentation method in operation of an example system described herein.

Referring to FIG. 7, process 700 illustrates the operation of a sample image processing system 800 for real-time image segmentation for image processing in accordance with at least some implementations of the present disclosure. In more detail, in the illustrated form, process 700 may include one or more operations, functions or actions as illustrated by one or more of actions 702 to 724 numbered evenly. By way of non-limiting example, process 700 will be described herein with reference to FIG. 8. Specifically, system 800 includes logic units or modules 804. The logic modules 804 may include a raw image handling unit 806, optionally a depth map generator unit 808, and an image segmentation unit 810. The segmentation unit 810 may have an initial segmentation and contour setting unit 814, and a multi-frame segmentation unit 812 that has an accuracy-based segmentation unit 816 and a speed-based segmentation unit 818. These units have tasks scheduled by a thread scheduler/context switch unit 830 at one or more processors 820 to perform the segmentation by a thread. The operation of the system may proceed as follows.

Process 700 may include "obtain initial segmentation mask of earlier frame" 702, and as described above with processes 300 and 500. As described above, this operation may preliminarily include obtaining the raw image data that has already been pre-processed sufficiently for segmentation and may provide pixel color and luminance values and/or other data such as gradients, histograms, and so forth. This also may include image data analyzed to provide a depth map when available. It will be understood that since the frames are in a video sequence, the form of the frames for obtaining the image data here applies to any of the frames in the sequence.

This operation also may preliminarily include the selection of the area to be segmented in the first place. Particularly, a user may manually place a boundary around an area in an image that is to be segmented or around one or more foreground objects to be separated form a background. Otherwise, the boundary may be inserted on the image automatically, or even omitted when the entire image is to be segmented. This also is explained in greater detail above.

The initial segmentation may include a highly accurate segmentation algorithm that analyzes the entire area to be segmented and defines an initial (or early or previous) contour for a previous or early frame (which may be the start frame). Otherwise, a rough or course segmentation may be performed first, and by many known methods some of which are already described above. One method performs the rough segmentation by using depth data rather than color data. The result of the rough segmentation may be a binary segmentation map or mask with 0s and 1s at each pixel location differentiating adjacent segments (such as background and foreground). The location of border bands (or unknown regions) that divide two segments may or may not be determined as a preliminary operation to form a tri-map. Such contour and unknown region may be subsequently and automatically detected by find contour algorithms as explained herein. A final or refined segmentation or unknown region location may be determined by a color-based segmentation such as graph-cut or active contour as described above. The result may be an initial or previous contour in the form of an accurate binary tri-map showing the segments and the unknown region between the segments. This previous contour is then stored in memory for later use as the most current contour.

By one option, process 700 may include "obtain image data of next ("prior") frame" 704, and as explained above, a next frame is obtained, and the previous contour in the memory is tracked to the next (or prior frame). Also as mentioned, the next frame to be used for accuracy-based segmentation also may be a frame that is, or already was, used as a subsequent frame on a different thread to be displayed in real-time. Here, process 700 may include "place mask of earlier frame on the prior frame" 706, and this locates the stored previous contour on the prior frame in the same location as the previous contour was located on the previous frame.

Then, process 700 may include "apply accuracy-based segmentation algorithm to unknown region on prior frame and on available thread" 708. This, modifies the position of the previous contour to form a new prior contour that is positioned along the edges of the objects in the prior frame. The accuracy-based segmentation algorithm is as explained above including an accurate graph-cut type of segmentation algorithm. Thereafter, process 700 may include "provide output prior contour" 710 to place the prior contour in memory as the most current contour. By one form, the prior contour is output to the memory and replaces the previous contour in the memory. Also, process 700 may include "set prior frame as earlier frame" 712, where the prior frame is now considered the earlier or previous frame that will use its now previous contour to track to a new next or prior frame using accuracy-based segmentation.

Accordingly, process 700 then may include "more frames?" 714, and as described above, the process 700 loops to operation 704 and obtains the next frame if provided. The accuracy-based segmentation is then repeated (operations 704 to 712) to provide a new current prior contour in the memory for use by a subsequent frame. Also as explained above, this processing may be performed in a different thread than the thread used for the loop that was just analyzed or is in the process of being analyzed. Thus, while process 700 shows the inquiry for more frames is after operation 712, in actuality, the process does not wait for this point and continues with the next frame as soon as a next frame is received. Thus, there may be a number of loops being performed simultaneously and at different stages depending on how many threads are being used. If there are no more frames, the process displays the frames being analyzed and then ends.

Turning now to the speed-based segmentation algorithm, process 700 may include "obtain image data of subsequent frame using same thread" 716, and the frames are obtained as the frames are captured by the camera, and with image data provided as with the frames described above. The processing of the subsequent frame continues on the same thread where the output prior contour was generated and is to be placed on the subsequent frame being analyzed.

Process 700 may include "locate prior contour on subsequent frame" 718. The latest or most current prior contour in memory is retrieved and is placed in the same location as it was on the prior frame. Then, process 700 may include "apply speed-based segmentation algorithm to adjust prior contour to objects on subsequent frame to form subsequent contour" 720, and as described above, this may be an active contour-type of algorithm by one example speed-based segmentation and that modifies points on the contour along edges of objects in the subsequent frame so that pixels are assigned to one segment or another.

Process 700 then may include "provide subsequent contour to modify subsequent frame before displaying subsequent frame in real-time" 722, and by color pop for example although there are many other ways to filter or modify an image using the segmentation as mentioned above. Thereafter, the frames as segmented and modified may be displayed. As mentioned this part of the process to segment, modify, and display the subsequent frame may only need about 10 ms so that the subsequent frame can be displayed in real-time.

Process 700 also may include the query "more frames" 724, and if so, the process loops to operation 716 to segment and display the next subsequent frame. As mentioned with the accuracy-based segmentation loop, this inquiry also may be passive and really operates another loop when another frame is received that is to be displayed as a subsequent frame.

In addition, any one or more of the operations of FIGS. 3, 4, 5A-5B, and 7 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or fixed function firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein.

One of ordinary skill in the art will appreciate that operations performed by hardware and/or fixed function firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 8:
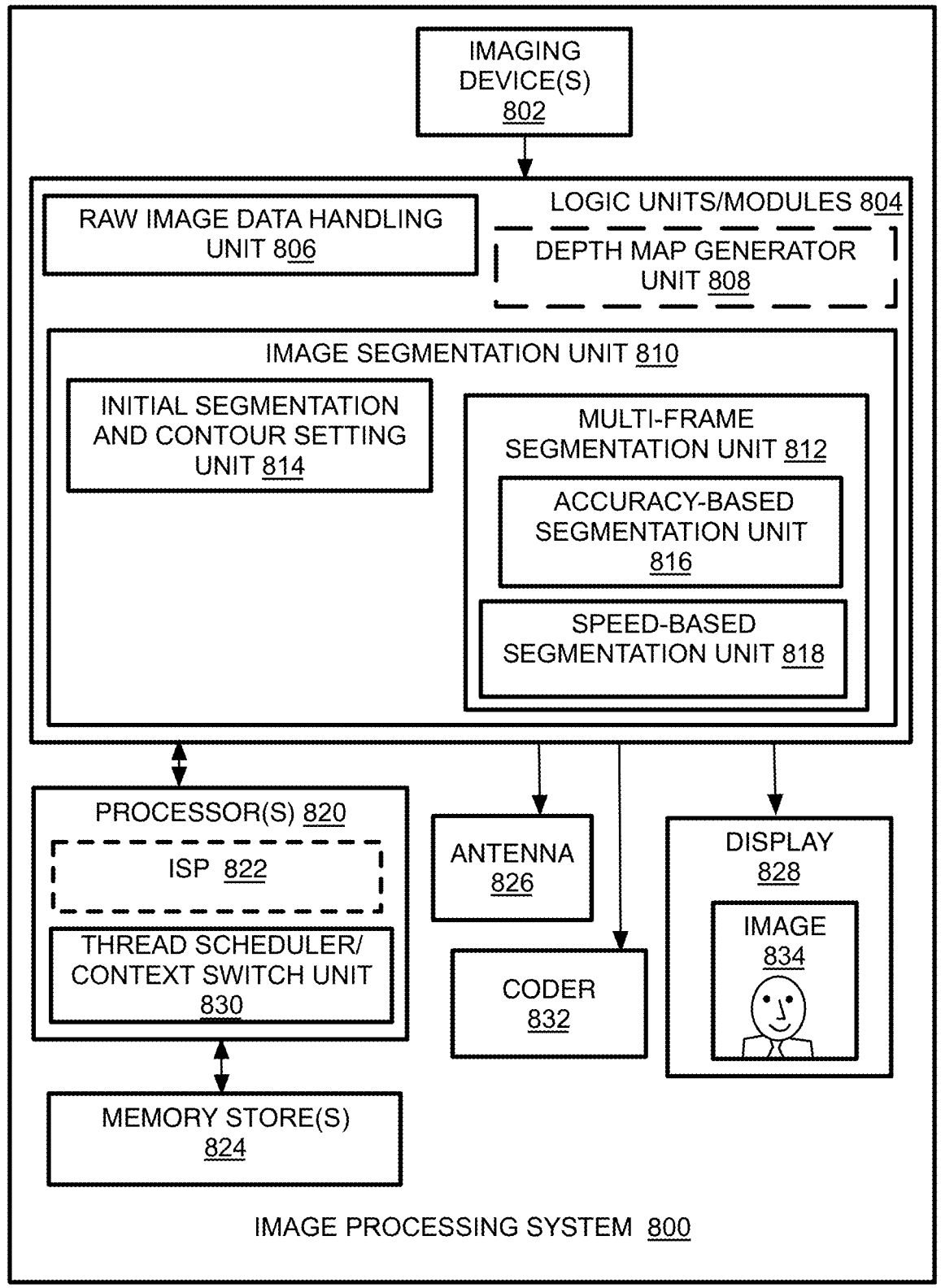
FIG. 8 is an illustrative diagram of an example system.

Referring to FIG. 8, an example image processing system 800 is arranged in accordance with at least some implementations of the present disclosure. In various implementations, the example image processing system 800 may have an imaging device 802 to form or receive captured image data. This can be implemented in various ways. Thus, in one form, the image processing system 800 may be one or more digital cameras or other image capture devices, and imaging device 802, in this case, may be the camera hardware and camera sensor software, module, or component. In other examples, imaging processing system 800 may have an imaging device 802 that includes or may be one or more cameras, and logic modules 804 may communicate remotely with, or otherwise may be communicatively coupled to, the imaging device 802 for further processing of the image data.

Thus, image processing system 800 may be a single camera alone or on a multi-camera device either of which may be a smartphone, tablet, laptop, or other mobile device. Otherwise, system 800 may be the tablet or other device with multiple cameras where the processing occurs at one of the cameras or at a separate processing location communicating with the cameras whether on-board or off of the tablet or other device, and whether the processing is performed at a mobile device or not.

In any of these cases, such technology may include a camera such as a digital camera system, a dedicated camera device, or an imaging phone or tablet, such as a video camera, camera that provides a preview screen, or some combination of these. Thus, in one form, imaging device 802 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 802 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor also may support other types of electronic shutters, such as global shutter in addition to, or instead of, rolling shutter, and many other shutter types. In other examples, an RGB-Depth camera and/or microphone-array might be used in the alternative to a camera sensor. In some examples, imaging device 802 may be provided with an eye tracking camera.

In the illustrated example and relevant here, the logic modules 804 may include a raw image handling unit 806 that performs pre-processing on the image data sufficient for segmentation but also may be sufficient for generating a depth map or depth image, a depth map generation unit 808 that performs depth algorithms typically on multiple images of the same scene, and to form a three dimensional space where the pixels or points have three dimensional (x, y, z) coordinates on a resulting depth map or depth image that represents the three dimensional space (or 2D image or set of images of the same scene).

The logic modules also may have an image segmentation unit 810 to perform many of the operations already described herein. Thus, for example, the segmentation unit 810 may have an initial segmentation and contour setting unit 814 to establish the initial accurate contour as the first up-to-date contour for the memory 824. A multi-frame segmentation unit 812 provides an accuracy-based segmentation unit 816 to track the current contour in memory to a prior frame, and a speed-based segmentation unit 818 to track the prior contour of the prior frame to a subsequent frame. It will be understood, and as explained above, the initial segmentation unit may use different segmentation algorithms as well as contour setting and unknown region finding techniques to set the initial contour and that are not necessarily used by the accuracy-based and speed-based segmentation units.

The image processing system 800 may have one or more processors 820 which may include a dedicated image signal processor (ISP) 822 such as the Intel Atom and that may have a thread scheduler/context switch unit 830 to manage the processing of the frames of the video sequence. The thread scheduler unit 830 may manage a thread pool that assigns accuracy-based and speed-segmentation to threads in the pool as the threads become available. As described in detail above, multiple threads may be performing processing for the display of different frames in parallel.

The image processing system 800 also may have a memory stores 824 to store the most up-to-date or current contour as mentioned above, one or more displays 828 to provide images 834, a coder 832, and antenna 826. In one example implementation, the image processing system 800 may have the display 828, at least one processor 820 communicatively coupled to the display, and at least one memory 824 communicatively coupled to the processor. The coder 832 may be an encoder, decoder, or both. As an encoder 832, and with antenna 834, the encoder may be provided to compress image data for transmission to other devices that may display or store the image. It will be understood that as a decoder, the coder may receive and decode image data for processing by the system 800 to receive images for segmentation in addition to, or instead of, initially capturing the images with the device 800. Otherwise, the processed image 834 may be displayed on display 828 or stored in memory 824. As illustrated, any of these components may be capable of communication with one another and/or communication with portions of logic modules 804 and/or imaging device 802. Thus, processors 820 may be communicatively coupled to both the image device 802 and the logic modules 804 for operating those components. By one approach, although image processing system 800, as shown in FIG. 8, may include one particular set of blocks or actions associated with particular components or modules, these blocks or actions may be associated with different components or modules than the particular component or module illustrated here.

Figure 9:
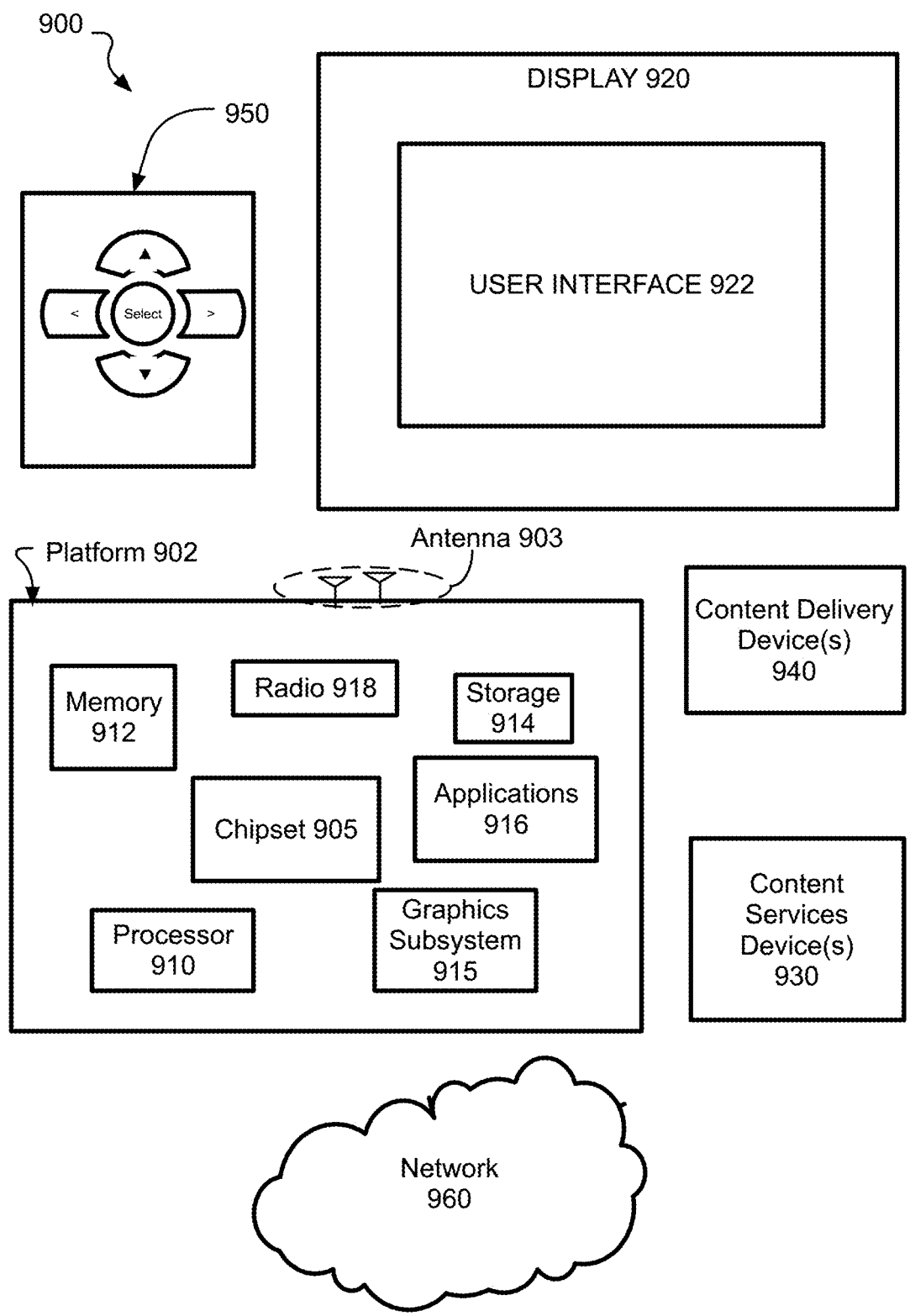
FIG. 9 is an illustrative diagram of another example system.

Referring to FIG. 9, an example system 900 in accordance with the present disclosure operates one or more aspects of the image processing system described herein. It will be understood from the nature of the system components described below that such components may be associated with, or used to operate, certain part or parts of the image processing system 1000 described above, and therefore, used to operate the methods described herein. In various implementations, system 900 may be a media system although system 900 is not limited to this context. For example, system 900 may be incorporated into a digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, Display Port, wireless HDMI, and/or wireless HD compliant techniques. Graphics subsystem 915 may be integrated into processor 910 or chipset 905. In some implementations, graphics subsystem 915 may be a stand-alone card communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of controller 950 may be used to interact with user interface 922, for example. In implementations, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In implementations, controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various implementations, platform 902 and display 920 may be an integrated unit. Display 920 and content service device(s) 930 may be integrated, or display 920 and content delivery device(s) 940 may be integrated, for example. These examples are not meant to limit the present disclosure.

In various implementations, system 900 may be implemented as a wireless system, a wired system, or a combination of both. When implemented as a wireless system, system 900 may include components and interfaces suitable for communicating over a wireless shared media, such as one or more antennas 903, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, text ("texting") message, social media formats, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 9.

Figure 10:
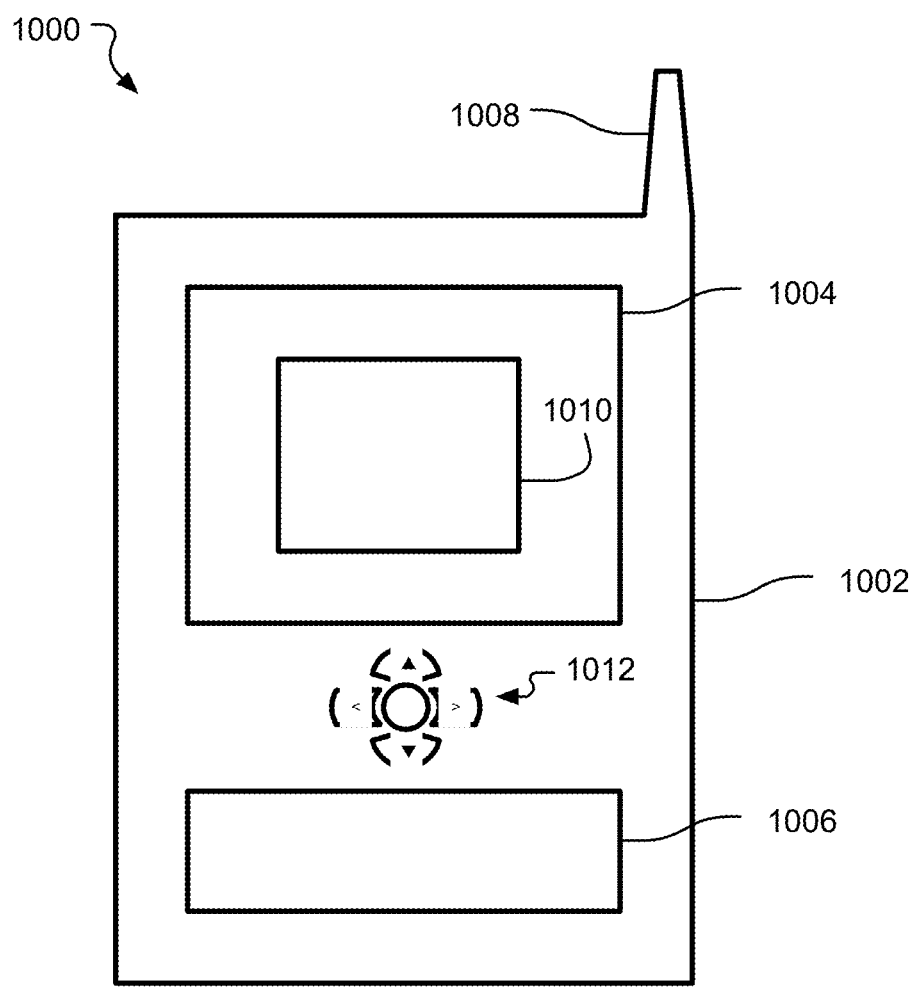
FIG. 10 illustrates another example device, all arranged in accordance with at least some implementations of the present disclosure.

Referring to FIG. 10, a small form factor device 1000 is one example of the varying physical styles or form factors in which system 800 and/or 900 may be embodied. By this approach, device 1000 may be implemented as a mobile computing device having wireless capabilities and multiple cameras. A mobile computing device may refer to any device having a processing system and a mobile power source or supply, such as one or more batteries, for example.

As described above, examples of a mobile computing device may include a digital video camera, mobile devices with camera or video functions such as imaging phones, webcam, personal computer (PC), laptop computer, ultra-laptop computer, tablet with or without multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 10, device 1000 may include a housing 1002, a display 1004 including a screen 1010, an input/output (I/O) device 1006, and an antenna 1008. Device 1000 also may include navigation features 1012. Display 1004 may include any suitable display unit for displaying information appropriate for a mobile computing device. I/O device 1006 may include any suitable I/O device for entering information into a mobile computing device. Examples for I/O device 1006 may include an alphanumeric keyboard, a numeric keypad, a touch pad, input keys, buttons, switches, rocker switches, microphones, speakers, voice recognition device and software, and so forth. Information also may be entered into device 1000 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, fixed function firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example implementation, a computer-implemented method of real-time image segmentation for image processing may comprise obtaining image data of a plurality of frames of a video sequence comprising a prior frame and a subsequent frame relative to the prior frame and in display order of the video sequence; using an accuracy-based segmentation algorithm to determine a prior contour separating segments on the prior frame; and using a speed-based segmentation algorithm applied to the prior contour located on the subsequent frame to determine a subsequent contour on the subsequent frame to be used to modify or display or both the subsequent frame.

By another implementation, this method may comprise wherein the accuracy-based segmentation algorithm is applied to an unknown region on the prior frame that separates one segment from another segment on the prior frame without applying the accuracy-based segmentation to the whole segments in order to provide the prior contour to be adjusted by the speed-based segmentation algorithm.

Also, the method may comprise generating the prior contour comprising obtaining a stored previous contour of an earlier frame earlier than the prior frame in display order, and applying the accuracy-based segmentation algorithm to the previous contour located on the prior frame; locating the prior contour on the subsequent frame; and adjusting the prior contour to edges of at least one object on the subsequent frame to derive the subsequent contour; and displaying the subsequent frame in real-time; wherein the prior frame is displayed without using the prior contour to display the prior frame; wherein the accuracy-based segmentation algorithm is slower and more accurate than the speed-based segmentation algorithm; wherein the subsequent contour is used to modify the image data of the subsequent frame to provide a visible difference to the subsequent frame; wherein the accuracy-based segmentation algorithm is a graph-cut type of algorithm; wherein the speed-based segmentation algorithm is an active-contour type of algorithm; wherein the prior frame is not immediately prior to the subsequent frame; and wherein the prior frame is two frames before the subsequent frame in the display order.

By other approaches, a system may comprise at least one display; at least one memory to store image data and at least one segmentation contour; at least one processor communicatively coupled to the at least one of the memory and display; and at least one segmentation unit operated by the at least one processor and to operate by: obtaining image data of a plurality of frames of a video sequence comprising a prior frame and a subsequent frame relative to the prior frame and in display order of the video sequence; using an accuracy-based segmentation algorithm to determine a prior contour separating segments on the prior frame; and using a speed-based segmentation algorithm applied to the prior contour located on the subsequent frame to determine a subsequent contour on the subsequent frame to be used to modify or display or both the subsequent frame.

By a further approach, the system may include wherein the at least one segmentation unit is to be operated by processing the segmentation of the frames of the video sequence on multiple threads feeding data to the at least one processor so that consecutive frames of the video sequence displayed in real-time are processed by different threads; wherein the prior frame is at least two frames before the subsequent frame; wherein a skipped frame that is skipped between the subsequent frame and the prior frame is displayed in real-time by a different thread than a thread that skipped the skipped frame; wherein the prior contour of the prior frame used to form the subsequent contour is not used directly either to modify or display the prior frame; wherein the at least one segmentation unit is to be operated by using one thread to use the prior contour of the prior frame as a preliminary contour to determine the subsequent contour to display the subsequent contour, and a different thread to use the prior frame as the subsequent frame to display the prior frame in real-time; wherein the segmentation algorithms are arranged in an order so that the subsequent contour is a result of the processing on the subsequent frame used to convert the prior contour to the subsequent contour, and no subsequent contour is used to determine a contour of another frame; wherein no two consecutive frame periods use the speed-based segmentation algorithm along the same thread; wherein the accuracy-based segmentation algorithm is a graph-cut type of algorithm; and wherein the speed-based segmentation algorithm is an active-contour type of algorithm.

In yet another example, a computer-readable medium has stored thereon instructions that when executed cause a computing device to operate by: obtaining image data of a plurality of frames of a video sequence comprising a prior frame and a subsequent frame relative to the prior frame and in display order of the video sequence; using an accuracy-based segmentation algorithm to determine a prior contour separating segments on the prior frame; and using a speed-based segmentation algorithm applied to the prior contour located on the subsequent frame to determine a subsequent contour on the subsequent frame to be used to modify or display or both the subsequent frame.

By one approach, the computer-readable medium includes wherein the accuracy-based segmentation algorithm is applied to an unknown region on the prior frame that separates one segment from another segment on the prior frame without applying the accuracy-based segmentation to the whole segments in order to provide the prior contour to be adjusted by the speed-based segmentation algorithm. The instructions cause the computing device to operate by: generating the prior contour comprising obtaining a stored previous contour of an earlier frame earlier than the prior frame in display order, and applying the accuracy-based segmentation algorithm to the previous contour located on the prior frame; locating the prior contour on the subsequent frame; and adjusting the prior contour to edges of at least one object on the subsequent frame to derive the subsequent contour; and displaying the subsequent frame in real-time; wherein the prior frame is displayed without using the prior contour to display the prior frame; wherein the accuracy-based segmentation algorithm is slower and more accurate than the speed-based segmentation algorithm; wherein the subsequent contour is used to modify the image data of the subsequent frame to provide a visible difference to the subsequent frame; wherein the accuracy-based segmentation algorithm is a graph-cut type of algorithm; wherein the speed-based segmentation algorithm is an active-contour type of algorithm; wherein the prior frame is not immediately prior to the subsequent frame; and wherein the prior frame is two frames before the subsequent frame in the display order.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of segmentation for image processing comprising:

obtaining image data of a plurality of frames of a video sequence comprising a prior frame and a subsequent frame relative to the prior frame and in display order of the video sequence;

using an accuracy-based segmentation algorithm to determine a prior contour separating segments on the prior frame; and using a speed-based segmentation algorithm applied to the prior contour as taken from the prior frame and placed on the subsequent frame to determine a subsequent contour on the subsequent frame to be used to modify or display or both the subsequent frame.

2. The method of claim 1 comprising displaying the subsequent frame in real-time.

3. The method of claim 1 wherein the prior frame is displayed without using the prior contour formed to display the prior frame.

4. The method of claim 1 wherein the accuracy-based segmentation algorithm is slower and more accurate than the speed-based segmentation algorithm.

5. The method of claim 1 comprising locating the prior contour on the subsequent frame; and adjusting the prior contour to edges of at least one object on the subsequent frame to derive the subsequent contour.

6. The method of claim 1 wherein the subsequent contour is used to modify the image data of the subsequent frame to provide a visible difference to the subsequent frame.

7. The method of claim 1 wherein the accuracy-based segmentation algorithm is a graph-cut type of algorithm.

8. The method of claim 1 wherein the speed-based segmentation algorithm is an active-contour type of algorithm.

9. The method of claim 1 wherein the prior frame is not immediately prior to the subsequent frame.

10. The method of claim 1 wherein the prior frame is two frames before the subsequent frame in the display order.

11. The method of claim 1 wherein the accuracy-based segmentation algorithm is applied to an unknown region on the prior frame that separates one segment from another segment on the prior frame without applying the accuracy-based segmentation to the whole segments in order to provide the prior contour to be adjusted by the speed-based segmentation algorithm.

12. The method of claim 11 comprising generating the prior contour comprising obtaining a stored previous contour of an earlier frame earlier than the prior frame in display order, and applying the accuracy-based segmentation algorithm to the previous contour located on the prior frame.

13. The method of claim 1:

the method comprising:

generating the prior contour comprising obtaining a stored previous contour of an earlier frame earlier than the prior frame in display order, and applying the accuracy-based segmentation algorithm to the previous contour located on the prior frame;

locating the prior contour on the subsequent frame; and adjusting the prior contour to edges of at least one object on the subsequent frame to derive the subsequent contour; and displaying the subsequent frame in real-time.

14. A computer-implemented system comprising:

at least one display;

at least one memory to store image data and at least one segmentation contour;

at least one processor communicatively coupled to the at least one of the memory and display; and at least one segmentation unit operated by the at least one processor and to operate by:

obtaining image data of a plurality of frames of a video sequence comprising a prior frame and a subsequent frame relative to the prior frame and in display order of the video sequence;

using an accuracy-based segmentation algorithm to determine a prior contour separating segments on the prior frame; and using a speed-based segmentation algorithm applied to the prior contour as taken from the prior frame and placed on the subsequent frame to determine a subsequent contour on the subsequent frame to be used to modify or display or both the subsequent frame.

15. The system of claim 14 wherein the at least one segmentation unit is to be operated by processing the segmentation of the frames of the video sequence on multiple threads feeding data to the at least one processor so that consecutive frames of the video sequence displayed in real-time are processed by different threads.

16. The system of claim 14 wherein the prior frame is at least two frames before the subsequent frame, wherein the at least one segmentation unit is to be operated by processing the segmentation of the frames of the video sequence on multiple threads feeding data to the at least one processor, and wherein a skipped frame that is skipped between the subsequent frame and the prior frame is displayed in real-time by a different thread than a thread that skipped the skipped frame.

17. The system of claim 14 wherein the prior contour of the prior frame used to form the subsequent contour is not used directly either to modify or display the prior frame.

18. The system of claim 14 wherein the at least one segmentation unit is to be operated by using one thread to use the prior contour of the prior frame as a preliminary contour to determine the subsequent contour to display the subsequent contour, and a different thread to use the prior frame as the subsequent frame to display the prior frame in real-time.

19. The system of claim 14 wherein the segmentation algorithms are arranged in an order so that the subsequent contour is a result of the processing on the subsequent frame used to convert the prior contour to the subsequent contour, and no subsequent contour is used to determine a contour of another frame.

20. The system of claim 14 wherein no two consecutive frame periods use the speed-based segmentation algorithm along the same thread.

21. The system of claim 14 wherein the accuracy-based segmentation algorithm is a graph-cut type of algorithm.

22. The system of claim 14 wherein the speed-based segmentation algorithm is an active-contour type of algorithm.

23. The system of claim 14
wherein the accuracy-based segmentation algorithm is a graph-cut type of algorithm; and
wherein the speed-based segmentation algorithm is an active-contour type of algorithm.

24. A non-transitory computer-readable medium having stored thereon instructions that when executed cause a computing device to operate by:
obtaining image data of a plurality of frames of a video sequence comprising a prior frame and a subsequent frame relative to the prior frame and in display order of the video sequence;
using an accuracy-based segmentation algorithm to determine a prior contour separating segments on the prior frame; and
using a speed-based segmentation algorithm applied to the prior contour as taken from the prior frame and placed on the subsequent frame to determine a subsequent contour on the subsequent frame to be used to modify or display or both the subsequent frame.

25. The non-transitory computer-readable medium of claim 24 wherein the accuracy-based segmentation algorithm is applied to an unknown region on the prior frame that separates one segment from another segment on the prior frame without applying the accuracy-based segmentation to the whole segments in order to provide the prior contour to be adjusted by the speed-based segmentation algorithm.

* * * * *